US010928676B2

(12) United States Patent
Shan (10) Patent No.: US 10,928,676 B2
(45) Date of Patent: *Feb. 23, 2021

(54) DISPLAY DEVICE (71) Applicant: HKC Corporation Limited, Shenzhen (CN)

(72) Inventor: Jianfeng Shan, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/647,079

(22) PCT Filed: Sep. 11, 2018

(86) PCT No.: PCT/CN2018/105079
§ 371 (c)(1),
(2) Date: Mar. 13, 2020

(87) PCT Pub. No.: WO2019/052444
PCT Pub. Date: Mar. 21, 2019

(65) Prior Publication Data
US 2020/0209689 A1 Jul. 2, 2020

(30) Foreign Application Priority Data
Sep. 18, 2017 (CN) .......................... 201710841422.5

(51) Int. Cl.
G02F 1/13357 (2006.01)
(52) U.S. Cl.
CPC .. *G02F 1/133611* (2013.01); *G02F 1/133603* (2013.01); *G02F 2001/133628* (2013.01)

(58) Field of Classification Search
CPC ............. F21Y 2107/20; F21Y 2107/30; F21Y 2107/70; F21Y 2107/80; G02F 1/133603; G02B 6/0068; G02B 6/0091
See application file for complete search history.

(56) References Cited

U.S. PATENT DOCUMENTS 8,506,151 B2 * 8/2013 Park ....................... G02B 6/002
362/613
8,757,860 B2 * 6/2014 Ueyama ............... G02B 6/0073
362/612

(Continued)

FOREIGN PATENT DOCUMENTS

| CN | 102705744 A | 10/2012 |
| CN | 104620040 A | 5/2015 |
| CN | 204790052 U | 11/2015 |

OTHER PUBLICATIONS

China Patent Office "Office Action" dated Feb. 3, 2019, China.
China Patent Office "Office Action" dated Sep. 25, 2019, China.

*Primary Examiner* — Alexander K Garlen
(74) *Attorney, Agent, or Firm* — WPAT, PC (57) ABSTRACT A display device is provided. The display device includes a display panel, a frame including a back plate therein, a backlight module including a light source used for emitting light to the display panel. The light source includes a light bar with a plurality of light emitting units. The light bar is fixed on the back plate, and the light bar is oppositely disposed on the back plate, so that portions of light emitted by the light emitting units near two ends of the back plate on the light bar are shifted to corners of the display panel correspondingly.

20 Claims, 4 Drawing Sheets (56) References Cited

U.S. PATENT DOCUMENTS

| | | | | |
|---|---|---|---|---|
| 2007/0153159 A1* | 7/2007 | Jung | ............... | G02B 6/0073 |
| | | | | 349/69 |
| 2007/0230215 A1* | 10/2007 | Chang | ............ | G02B 6/0021 |
| | | | | 362/613 |
| 2008/0106912 A1* | 5/2008 | Yeom | .............. | G02B 6/0068 |
| | | | | 362/613 |
| 2010/0149802 A1* | 6/2010 | Chang | ............ | G02B 6/0081 |
| | | | | 362/235 |
| 2013/0121020 A1* | 5/2013 | Liu | ................ | G02B 6/0068 |
| | | | | 362/606 |
| 2013/0336000 A1* | 12/2013 | Huang | ........... | G02B 6/0011 |
| | | | | 362/607 |
| 2014/0043563 A1* | 2/2014 | Jeon | ............... | G02B 6/0021 |
| | | | | 349/65 |
| 2017/0082789 A1* | 3/2017 | Yasunaga | ....... | G02B 6/0068 |

\* cited by examiner

DISPLAY DEVICE

FIELD OF THE DISCLOSURE

The disclosure relates to a display technical field, and more particularly to a display device.

BACKGROUND

Liquid crystal display (LCD) devices include LCD TVs, liquid crystal displays, etc. The liquid crystal display devices generally use LEDs as a light source. In the manufacturing process of the liquid crystal display device, a plurality of LED light sources are positioned on a straight circuit board to form a light bar. The light bar is fixed to a side of heat dissipation aluminum board or of a back plate. After the circuit board is powered on, the LED light source on the light bar is driven to illuminate the LCD screen, thereby enabling people to view text or pictures displayed on a screen of the liquid crystal display device.

Figure 1:
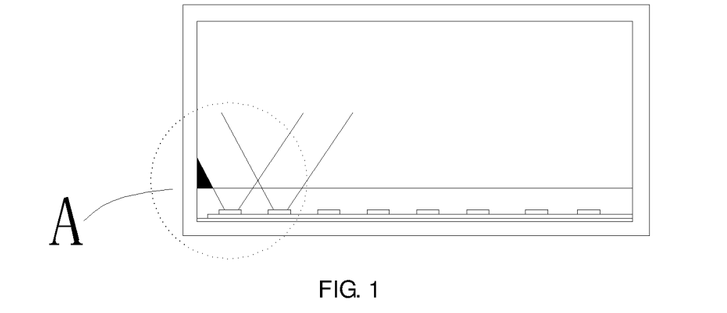
FIG. 1 is schematic view of forming a dark corner in an exemplary display device.
Figure 2:
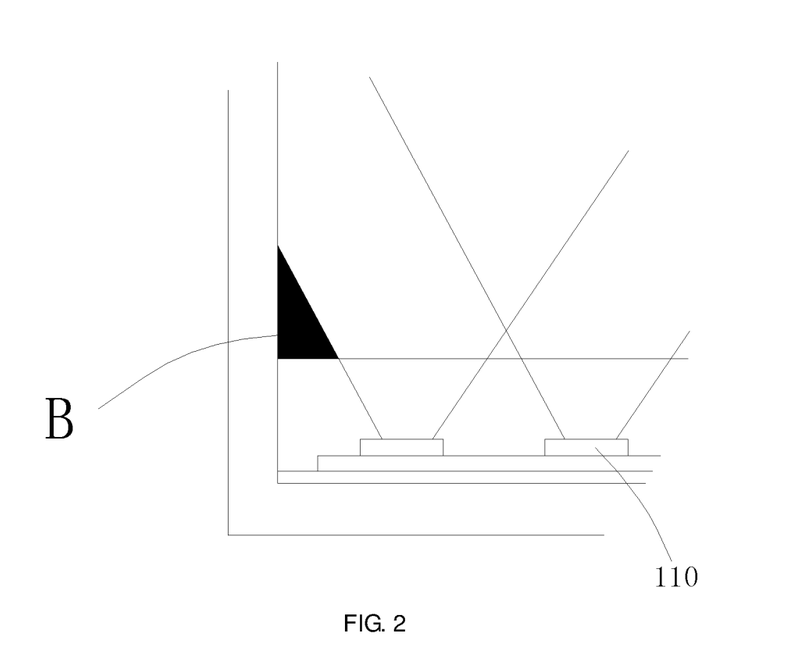
FIG. 2 is an enlarged view of portion A of FIG. 1.

However, as shown in FIG. 1 and FIG. 2, since the LED light source has a certain light emitting angle, the light emitted by the LED light source can not completely reach a corner formed by the light bar and the bottom of the LCD screen. The corner of the liquid crystal display device is at an edge of the light emitting angle of LED light source or beyond the light emitting angle, and vignetting (dark corner) would be formed. Consequently, viewing and processing of the content at the corners of the LCD screen is affected.

SUMMARY

The present disclosure provides a display device. The display device includes a display panel, a frame including a back plate therein, a backlight module including a light source used for emitting light to the display panel. The light source includes a light bar with a plurality of light emitting units. Wherein the light bar is fixed on the back plate, and the light bar is oppositely disposed on the back plate, so that portions of light emitted by the light emitting units near two ends of the back plate on the light bar are shifted to corners of the display panel correspondingly.

In one embodiment of the present disclosure, the light bar being oppositely disposed on the back plate includes the two ends of the light bar being inclined with respect to the back plate, so that the portions of light emitted by the light emitting units near two ends of the back plate on the light bar are shifted to corners.

In one embodiment of the present disclosure, the light bar being oppositely disposed on the back plate includes the light bar being arched relative to the back plate, so that the light emitting units of the light bar near two ends of the back plate are correspondingly in arc-shaped distribution, and the portions of light emitted by the light emitting units near two ends of the back plate are shifted to corners.

In one embodiment of the present disclosure, the light emitting units of the light bar are correspondingly in the arc-shaped distribution, and there is a preset angle between an optical normal of the light emitting unit and a plane corresponding to the frame.

In one embodiment of the present disclosure, the preset angle is in the range from 60 degrees to 90 degrees.

In one embodiment of the present disclosure, a radius of curvature of an arc point where the light emitting units on the light bar near two ends of the back plate respectively are located is less than a preset maximum value; the preset maximum value is a maximum radius of curvature of the arc point, at the arc point with the maximum radius of curvature, the light with the largest offset angle relative to optical normal emitted by the light emitting units near the two ends of the back plate is projected to a vertex of a corner of the display panel.

In one embodiment of the present disclosure, heat dissipation material is filled between the light bar and the back plate.

In one embodiment of the present disclosure, the display panel includes a display area and a non-display area connected to the display area, a part of intersections formed by the light emitted by two adjacent light emitting units on the light bar are located on a boundary between the display area and the non-display area or on the non-display area.

In one embodiment of the present disclosure, the part of intersections being located on the boundary between the display area and the non-display area or on the non-display area includes only one intersection point located on the boundary between the display area and the non-display area.

In one embodiment of the present disclosure, an offset angle formed between the optical normal of the light emitting unit and the horizontal direction or vertical direction is in the range from 0 degrees to 30 degrees.

In one embodiment of the present disclosure, an angle formed between the optical normal of the light emitting unit and a plane corresponding to the frame is in the range from 60 degrees to 90 degrees.

In one embodiment of the present disclosure, the back plate is flat, and the light bar is in an arch shape relative to the back plate.

In one embodiment of the present disclosure, the light bar is in an arch shape, and the arch shape is a circular arc or a non-circular arc.

In one embodiment of the present disclosure, distance between the back plate and the light emitting unit on the light bar increases from both ends of the back plate toward a middle of the back plate.

The present disclosure also provides a display device. The display device includes a display panel, a frame including a back plate therein, a backlight module including a light source used for emitting light to the display panel. The light source includes a light bar with a plurality of light emitting units. Wherein the light bar is arched relative to the back plate, so that the light emitting units of the light bar near two ends of the back plate are correspondingly in arc-shaped distribution, and the portions of light emitted by the light emitting units near two ends of the back plate are shifted to corners. Or the two ends of the light bar are inclined with respect to the back plate, so that the portions of light emitted by the light emitting units near two ends of the back plate on the light bar are shifted to corners.

In one embodiment of the present disclosure, the back plate is flat, heat dissipation material is filled between the light bar and the back plate.

In one embodiment of the present disclosure, the display panel includes a display area a non-display area connected to the display area, a part of intersections formed by light emitted by two adjacent light emitting units on the light bar are located on a boundary between the display area and the non-display area or on the non-display area.

In one embodiment of the present disclosure, the part of intersections being located on a boundary between the display area and the non-display area or on the non-display area includes only one intersection point located on the boundary between the display area and the non-display area.

In one embodiment of the present disclosure, distance between the back plate and the light emitting unit on the light bar increases from both ends of the back plate toward a middle of the back plate.

The present disclosure also provides a display device. The display device includes a display panel, a frame including a back plate therein, a backlight module including a light source used for emitting light to the display panel. The light source includes a light bar with a plurality of light emitting units. Wherein the light bar is fixed on the back plate, and the light bar is oppositely disposed on the back plate, so that portions of light emitted by the light emitting units near two ends of the back plate on the light bar are shifted to corners of the display panel correspondingly; the light emitting units of the light bar are correspondingly in the arc-shaped distribution, and there is a preset angle between an optical normal of the light emitting unit and a plane corresponding to the frame; the preset angle is in the range from 60 degrees to 90 degrees; a radius of curvature of an arc point where the light emitting units on the light bar near two ends of the back plate respectively are located is less than a preset maximum value; the preset maximum value is a maximum radius of curvature of the arc point, at the arc point with the maximum radius of curvature, the light with the largest offset angle relative to optical normal emitted by the light emitting units near the two ends of the back plate is projected to a vertex of a corner of the display panel; heat dissipation material is filled between the light bar and the back plate; the display panel includes a display area and a non-display area connected to the display area, only one intersection formed by the light emitted by two adjacent light emitting units on the light bar are located on a boundary between the display area and the non-display area.

In the above display device, the portions of light emitted by the light emitting units near two ends of the back plate on the light bar can be shifted to corners of the display panel correspondingly, therefore dark corner area can be avoided. Consequently, the display device can improve display effect, and be more conducive to displaying and observing.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

With the development of display technologies, liquid crystal display device have gradually replaced the traditional anode-ray tube display devices due to some advantages such as slim shape, low power consumption and no radiation. The liquid crystal display device can include a liquid crystal display panel, a backlight module, and frame. As the liquid crystal display panel gradually moves toward the narrow or the borderless, the requirements on the frame assembly are higher and higher.

Liquid crystal display (LCD) devices include LCD TVs, liquid crystal displays, etc. The liquid crystal display devices generally use LEDs as light sources. In the manufacturing process of the liquid crystal display device, a plurality of LED light sources are positioned on a straight circuit board to form a light bar. The light bar is fixed to a side of heat dissipation aluminum board or of a back plate. After the circuit board is powered on, the LED light source on the light bar is driven to illuminate the LCD screen, thereby enabling people to view text or pictures displayed on a screen of the liquid crystal display device. Usually the dark corner is the area where the light LED light can not project. The dark corner usually occurs in the corner of the display panel. When the display device is assembled, the display panel is fixed on the frame. If the corner formed between adjacent side frames is not projected with light, the vignetting (dark corner) would be formed. The text or picture content on the vignetting area would not be viewed or viewed blur easily.

At present, the problem of forming the vignetting can not be avoided in the LCD devices assembly generally. As shown in FIG. 1 and FIG. 2, portion A in FIG. 1 shows a dark corner area formed in the display panel. FIG. 2 is an enlarged view of portion A of FIG. 1. The light emitted by the LED 110 can not be projected to the corner B, thereby the corner B area would form the vignetting. In the display panel, the corner B area would be relatively dark, and not user-friendly viewing.

Figure 3:
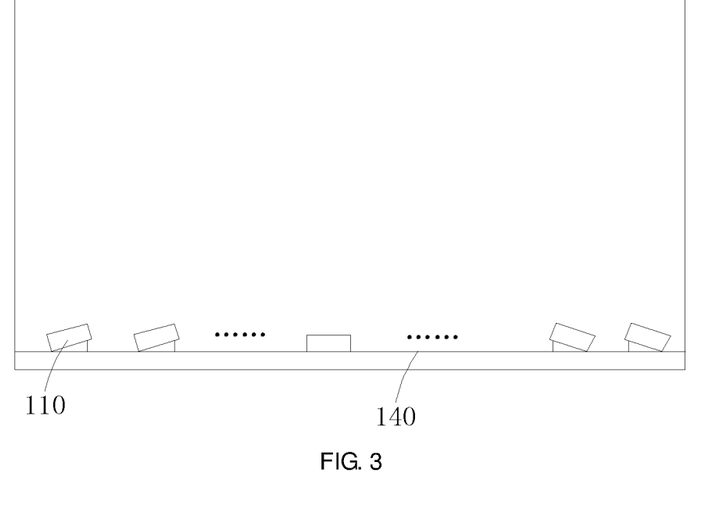
FIG. 3 is a structural schematic view of a light bar according to an embodiment of the disclosure.

Referring to FIG. 3, one embodiment of the present disclosure provides a display device including a display panel, a backlight module and a frame. The display panel and the backlight module are located in the frame. The frame includes a back plate 140 therein. The backlight module includes a light source used for emitting light to the display panel. The light source includes a light bar 120 with a plurality of light emitting units 110. The light bar 120 is fixed on the back plate 140, and the light bar 120 is oppositely disposed on the back plate 140, so that portions of light emitted by the light emitting units 110 near two ends of the back plate 140 on the light bar 120 can be shifted to corners of the display panel correspondingly.

In the above display device, the portions of light emitted by the light emitting units near two ends of the back plate on the light bar can be shifted to corners of the display panel correspondingly, therefore dark corner area can be avoided. Consequently, the display device can improve display effect, and be more conducive to displaying and observing.

In the embodiment of the present disclosure, the light emitting units 110 can be LED lamps.

In one embodiment, the light bar being oppositely disposed on the back plate includes the two ends of the light bar being inclined with respect to the back plate, so that the portions of light emitted by the light emitting units near two ends of the back plate on the light bar are shifted to corners. In detail, a part of the light bar on both ends of the back plate may be inclined with the back plate, so that the light emitting units on the part of the light bar can be tilted at a certain angle, and the light emitted by the light emitting units can be projected and covered area B at the corner. Wherein, the size of the angle can be set according to the actual situation, and various settings of different angles is not limited herein.

Figure 6:
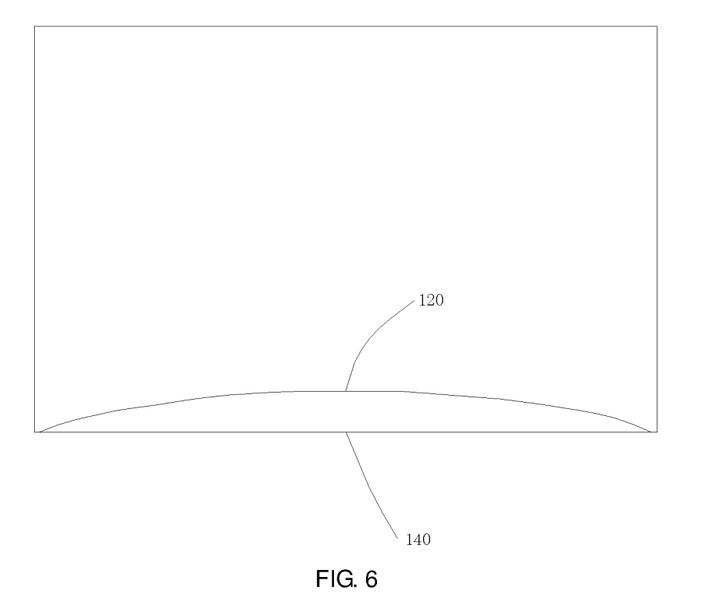
FIG. 6 a schematic structural view of an arc-shaped light bar in another embodiment of the disclosure.

In another embodiment, referring to FIG. 6, the light bar 120 can be arched relative to the back plate 140. The back plate 140 is disposed horizontally or vertically. As such, the portions of light emitted by the light emitting units 110 of the light bar 120 near two ends of the back plate 140 can be shifted to corners. The back plate 140 can be flat.

The arch shape can be a circular arc. When the light bar 120 is disposed in the arch shape with respect to the back plate 140, the light bars 120 may be bent from the two ends of the back plate 140 toward a middle of the frame to form the arch shape, and distance between the back plate 140 and the light emitting unit on the light bar 120 increases from both ends of the back plate 140 toward the middle of the back plate 140. As shown in FIG. 6, the light emitting unit 110 on the light bar 120 is not specifically shown. The light emitting units 110 are correspondingly in the arc-shaped distribution on the light bar 120. As can be seen from FIG. 6, the distance between the back plate 140 and the light emitting unit 110 on the light bar 120 increases from the both ends of the back plate 140 toward the middle of the back plate 140. The arched light bar 120 can allows better adjustment of the light emitting angle of the light emitting unit 110.

It should be pointed out that the arc is only one implementation that can be implemented in this embodiment, and the embodiment is not limited to that the light bar implements the contents of the embodiment in other shapes.

When the light emitting angle of the light emitting unit 110 is adjusted, the light emitting unit 110 at the corresponding corner need to be adjusted, so that the light emitted by the light emitting unit 110 can project and cover the area B at the corner to avoid vignetting. At the same time, in the display device, while avoiding vignetting, the arrangement of the arched light bar should also avoid to cause a bottom of the display panel to have shadows or dark lines. Therefore, intersections between the light emitted by the adjacent light emitting units 110 should be at least at the non-display area of the display panel aligned with the frame so as to ensure that there are no dark lines under the display panel.

Figure 7:
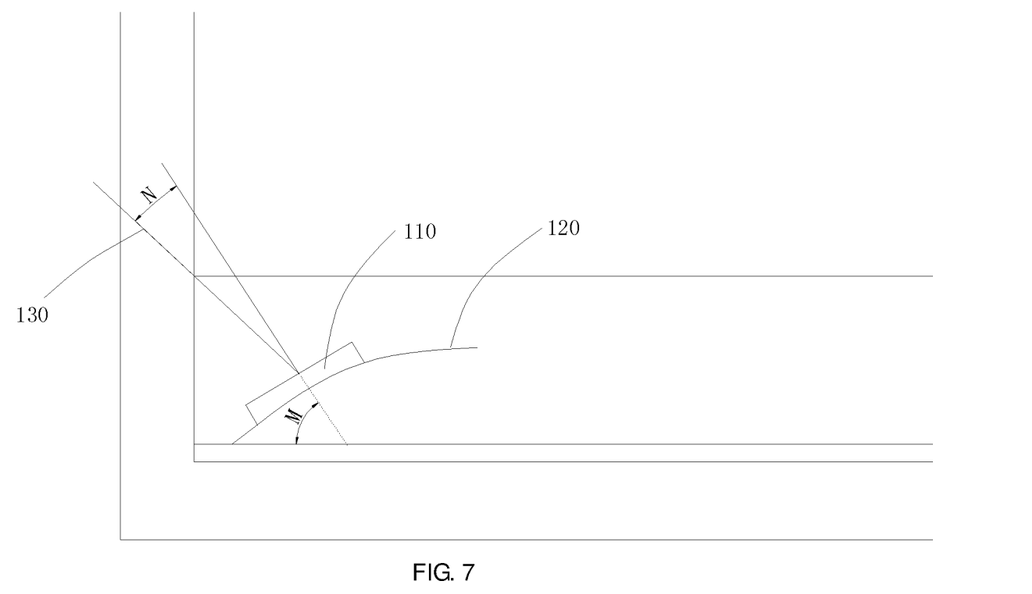
FIG. 7 is a schematic view of the light emitted by the light emitting unit that covers the corner B of FIG. 2 according to another embodiment of the disclosure.

For this reason, the light emitting units 110 are correspondingly distributed in an arc shape on the light bar 120, the optical normal formed by the light emitting units 110 and the plane corresponding to the frame define a preset angle. The optical normal of each light emitting units 110 on the light bar 120 have a preset angle M with the plane corresponding to frame. As shown in FIG. 7, the preset angle M can make the light emitted from the light emitting unit 110 cover the corner B so as to avoid vignetting.

FIG. 7 shows only one of the light emitting units 110 on the light bar. The light emitting unit 110 is located at one end of the back plate 140 and is the last light emitting unit at the end of the light bar. It can be known that each light emitting unit on the light bar can be correspondingly designed according to needs, and various light emitting unit can be adjusted by corresponding molds, and the implementation is not described in detail.

An offset angle N formed between the optical normal of the light emitting unit and the horizontal direction or vertical direction can be in the range from 0 degrees to 30 degrees. Correspondingly, the angle M formed between the optical normal of the light emitting unit 110 and the plane corresponding to the frame can be in the range from 60 degrees to 90 degrees. The light bar 120 has a straight line as a special arc, but in the embodiment, to avoid vignetting, this case is not included. Therefore, in the present embodiment, the preset angle M does not include 90 degrees.

The angle formed by the optical normal formed by the light emitting units 110 and the plane corresponding to frame is between 60 degrees and 90 degrees, so that the intersection between the light emitted by the adjacent LEDs can be at least at the non-display area of the display panel. Therefore, there are no dark lines under the display panel.

In order to avoid vignetting, the arc shape of the light bar 120 needs to be further designed. In another embodiment, a radius of curvature of an arc point where the light emitting units 110 on the light bar 120 near two ends of the back plate 140 respectively are located is less than a preset maximum value. The preset maximum value is a maximum radius of curvature of the arc point. At the arc point with the maximum radius of curvature, the light with the largest offset angle relative to optical normal emitted by the light emitting units 110 near the two ends of the back plate 140 is projected to a vertex of a corner of the display panel.

The larger the radius of curvature, the smaller degree of bending of the light bar 120, and the light bar 120 closer to the back plate 140, which may easily leads to the vignetting. In order to avoid vignetting, according to the display panel size, such as length, height, etc., the maximum radius of curvature of the light bar 120 should be calculated, while the degree of bending of the light bar 120 is minimum and vignetting can be avoided. While design, the radius of curvature of the arched light bar should be smaller than the maximum radius of curvature.

It should be understood that the light bar 120 can be a circular arc or a non-circular arc. The non-circular arc may result in the light emitting units at different positions of different radius of curvature. In this case, the preset maximum value is a maximum radius of curvature of the arc point where the light emitting units near the two ends of the back plate of the light bar are located.

In this embodiment, the light emitting units 110 may be separately disposed on the arc-shaped light bar according to needs, including the position, inclination angle and the like of the light emitting units 110 on the light bar, and the distance between the light emitting units 110.

When the light emitting unit 110 emits light, a certain amount of heat is generated. If the heat is not dissipated in time, the lifetime of the display device may be affected, and even to cause a malfunction. For this reason, heat dissipation material can be filled between the light bar 120 and the back plate 140. As such, when the light emitting unit emits light, the heat dissipation material can absorb the heat and dissipate the heat to the outside so as to enhance the display effect. Wherein, the heat dissipation material can be heat dissipation glue or the like.

Based on the above design, the appearance of dark lines on the display panel can be further avoided. The display panel can includes a display area and a non-display area connected to the display area. The display area is an area for displaying display content, when the display panel is working normally. The display content can include text, pictures and background, and the displayed contents can be operated through the display area. However, when the display device is assembled, a part of the display panel needs to be embedded in the frame. This part of the display panel is mainly fixed with the frame, and is referred to as a non-display area. The display area and non-display area have a clear boundary line therebetween. The intersections formed by light emitted by two adjacent light emitting units on the light bar must cover the boundary line so as to avoid the shadow or dark lines of the display panel. In this embodiment, the part of intersections formed by the light emitted by two adjacent light emitting units on the light bar are located on the boundary between the display area and the non-display area or on the non-display area. Wherein the part of intersections being located on the boundary between the display area and the non-display area or on the non-display area includes only one intersection point located on the boundary between the display area and the non-display area. The intersections of the light by light emitted by the two adjacent light emitting units are located on the boundary or in the non-display area, so as to prevent the display panel from generating shadows or dark lines.

Another embodiment of the present disclosure provides a display device including a display panel, a backlight module and a frame. The display panel and the backlight module are located in the frame. The frame includes a back plate 140 therein. The backlight module includes a light source used for emitting light to the display panel. The light source includes a light bar with a plurality of light emitting units. The light bar is arched relative to the back plate, so that the light emitting units of the light bar near two ends of the back plate are correspondingly in arc-shaped distribution, and the portions of light emitted by the light emitting units near two ends of the back plate are shifted to corners. Or the two ends of the light bar are inclined with respect to the back plate, so that the portions of light emitted by the light emitting units near two ends of the back plate on the light bar are shifted to corners.

In the above display device, the portions of light emitted by the light emitting units near two ends of the back plate on the light bar can be shifted to corners of the display panel correspondingly, therefore dark corner area can be avoided. Consequently, the display device can improve display effect, and be more conducive to displaying and observing.

One embodiment of the present disclosure provides a display device including a display panel, a backlight module and a frame. The display panel and the backlight module are located in the frame. The frame includes a back plate 140 therein. The backlight module includes a light source used for emitting light to the display panel. The light source includes a light bar 120 with a plurality of light emitting units 110. The light bar 120 is fixed on the back plate 140. The light emitting units 110 on the light bar 120 are inclined with respect to the back plate 140, so that portions of light emitted by the light emitting units 110 near two ends of the back plate 140 on the light bar 120 are shifted to corners of the display panel correspondingly.

In the above display device, the light emitting units on the light bar 120 is inclined with respect to the back plate, so that the portions of light emitted by the light emitting units near two ends of the back plate on the light bar can be shifted to corners of the display panel correspondingly, and therefore dark corner area can be avoided. Consequently, the display device can improve display effect, and be more conducive to displaying and observing.

The LED lamp 110 is fixed on a straight circuit board to form a light bar. The circuit board can be made of flexible material, and have a certain degree of ductility and bending. Fixing the light bar on the side of the back plate can provide the display device with light. Generally, the light emitting unit has a certain light emitting angle (the light-emitting angle is usually the angle at which the light generated by the light emitting unit deviates from the optical normal). The light emitting angles at both sides are symmetrical with the optical normal. As the corner of the border (corner) is difficult to set the light emitting unit, the vignetting can be formed easily. Therefore, the vignetting phenomenon can be changed by adjusting the light emitting angle of the light emitting unit.

That the light emitting units on the light bar 120 is inclined with respect to the back plate includes the light emitting units 110 on the light bar 120 inclined with respect to the corresponding frame at corresponding corners. The light emitting units 110 located in the middle of the light bar 120 may be disposed in parallel with the corresponding side frame. Referring to FIG. 3, the light bar can be set on one side of the frame. The light emitting unit 110 located in the middle of the light bar is parallel to the corresponding side of the frame. From the middle of the light bar to the left, the right side of the light emitting unit 110 is padded to incline. From the middle of the light bar to the right, the left side of the light emitting unit 110 is padded to incline. The optical normal formed by the inclined light emitting unit 110 is at a preset angle with respect to the plane corresponding frame, and the preset angle can be in the range from 60 degrees to 90 degrees. Wherein the light emitting unit 110 may be designed as a left high right low structure or a right high left low structure so as to facilitate the assembly of the display device.

It should be noted that, FIG. 3 merely provides a schematic view of one side of frame, and the left side and the right side are relative to each other, and on the other corresponding sides may also be defined by the orientation words such as the upper portion or the lower portion.

Figure 4:
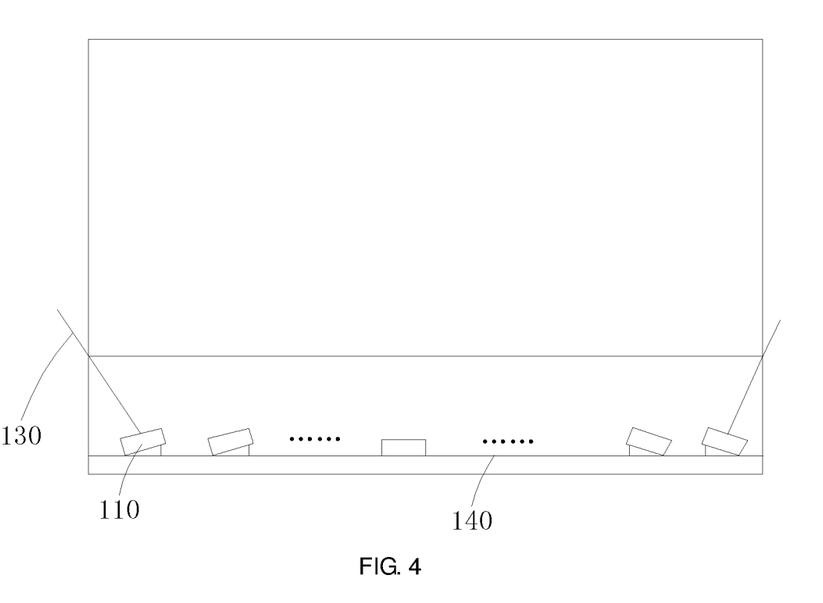
FIG. 4 is a schematic view of the light emitted by the light emitting unit that covers a corner B of FIG. 2 according to an embodiment of the disclosure.

As shown in FIG. 4, part of the light rays 130 emitted by the light emitting units 110 of the light bar near the two ends of the back plate are offset to the corners of the display panel, so that the light emitted by the light emitting unit 110 can project and cover the area B at the corner to avoid vignetting, and therefore the display effect can be improved. In detail, the light emitted by the leftmost light emitting unit can cover the dark corner area of the corresponding side, and the light emitted by the rightmost light emitting unit may also cover the dark corner area of the corresponding side. In FIG. 4, the light rays 130 emitted by the leftmost light emitting unit 110 may be the light with a maximum deviation from the corresponding optical normal angle, the light rays 130 emitted by the rightmost light emitting unit may be the light with the largest deviation from the corresponding optical normal angle. What needs to be guaranteed is that the light from the rightmost or leftmost LED that deviates from the corresponding optical normal with maximum angle coincides with the vertex of the corresponding corner, or project beyond the vertex of the corresponding corner, so as to avoid vignetting.

When the light emitting angle of the light emitting unit 110 is adjusted, the light emitting unit 110 at the corresponding corner need to be adjusted, so that the light emitted by the light emitting unit 110 can project and cover the area B at the corner to avoid vignetting. At the same time, in the display device, while avoiding vignetting, the inclined setting of the light emitting unit should also avoid to cause a bottom of the display panel to have shadows or dark lines. Therefore, intersections between the light emitted by the adjacent light emitting units 110 should be at least at the non-display area of the display panel aligned with the frame so as to ensure that there are no dark lines under the display panel.

The display panel can includes a display area and a non-display area connected to the display area. The display area is an area for displaying display content, when the display panel is working normally. The display content can include text, pictures and background, and the displayed contents can be operated through the display area. However, when the display device is assembled, a part of the display panel needs to be embedded in the frame. This part of the display panel is mainly fixed with the frame, and is referred to as a non-display area. The display area and non-display area have a clear boundary line therebetween. The intersections formed by light emitted by two adjacent light emitting units on the light bar must cover the boundary line so as to avoid the shadow or dark lines of the display panel. In this embodiment, the part of intersections formed by the light emitted by the two adjacent light emitting units on the light bar are located on the boundary between the display area and the non-display area or on the non-display area. Wherein the part of intersections being located on the boundary between the display area and the non-display area or on the non-display area includes only one intersection point located on the boundary between the display area and the non-display area. The intersections of the light emitted by the two adjacent light emitting units are located on the boundary or in the non-display area, so as to prevent the display panel from generating shadows or dark lines.

Another embodiment of the present disclosure provides a display device including a display panel, a backlight module and a frame. The display panel and the backlight module are located in the frame. The frame includes a back plate 140 therein. The backlight module includes a light source used for emitting light to the display panel. The light source includes a light bar 120 with a plurality of light emitting units 110. The light bar 120 is fixed on the back plate 140. The light bar 120 and the back plate 140 have the same shape, so that portions of light emitted by the light emitting units 110 near two ends of the back plate 140 on the light bar 120 are shifted to corners of the display panel correspondingly.

The light emitting units 110 can be LED lamps.

The two ends of the light bar and the corresponding back plate where the light emitting unit is located may be inclined with respect to the frame, so that portions of light emitted by the light emitting units near two ends of the back plate on the light bar can be shifted to corners of the display panel correspondingly. In detail, the light bars and back plate at both ends of the frame are inclined, an inclined angle can be set according to the specific situation.

Figure 5:
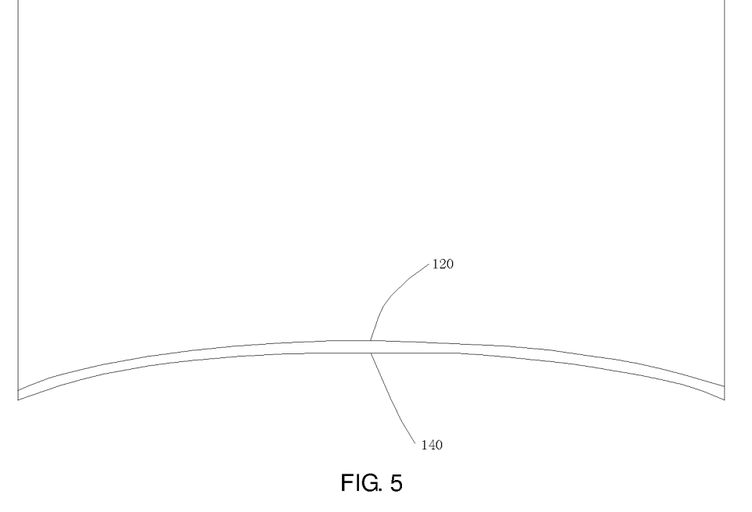
FIG. 5 a schematic structural view of an arc-shaped light bar in another embodiment of the disclosure.

Referring to FIG. 5, the light bar 120 and the back plate 140 are bent from both ends to the middle of the frame to form the same arc shape, so that portion of light emitted by the light emitting units near two ends of the back plate on the light bar can be shifted to corners of the display panel correspondingly.

The LEDs of light emitting units and a side frame corresponding to the back plate are not shown in FIG. 5, however it should be understood that the light emitting units are disposed on the light bar in the arc-shaped distribution. A distance between the frame and the light emitting unit on the light bar increases from both ends toward the middle of the frame.

As shown in FIG. 5, after the light bar 120 and the back plate 140 are bent from both ends to the middle of the frame to form the same arc shape, in the process of assembling the display device, a filler material may be added between the back plate 140 and the frame to fix the back plate and the light bar, so as to avoid loosening of the light bar during transportation and affecting the subsequent use.

When the light emitting angle of the light emitting unit 110 is adjusted, the light emitting unit 110 at the corresponding corner need to be adjusted, so that the light emitted by the light emitting unit 110 can project and cover the area B at the corner to avoid vignetting. At the same time, in the display device, while avoiding vignetting, the arrangement of the arched light bar should also avoid to cause a bottom of the display panel to have shadows or dark lines. Therefore, intersections formed by the light emitted by the adjacent light emitting units 110 should be at least at the non-display area of the display panel aligned with the frame so as to ensure that there are no dark lines under the display panel.

For this reason, the light emitting units 110 are correspondingly distributed in an arc shape on the light bar 120, the optical normal formed by the light emitting units 110 and the plane corresponding to the frame define a preset angle. The optical normal of each light emitting units 110 on the light bar 120 have a preset angle with the plane corresponding to frame. As shown in FIG. 7, the preset angle M can make the light emitted from the light emitting unit 110 cover the corner B so as to avoid vignetting.

FIG. 7 shows only one of the light emitting units 110 on the light bar. The light emitting unit 110 is located at one end of the back plate 140 and is the last light emitting unit at the end of the light bar. It can be known that each light emitting unit on the light bar can be correspondingly designed according to needs, and various light emitting unit can be adjusted by corresponding molds, and the implementation is not described in detail.

An offset angle N formed between the optical normal of the light emitting unit and the horizontal direction or vertical direction can be in the range from 0 degrees to 30 degrees. Correspondingly, the angle M formed between the optical normal of the light emitting unit 110 and the plane corresponding to the frame can be in the range from 60 degrees to 90 degrees. The light bar 120 has a straight line as a special arc, but in the embodiment, to avoid vignetting, this case is not included. Therefore, in the present embodiment, the preset angle M does not include 90 degrees.

The angle formed by the optical normal formed by the LEDs of the light emitting units 110 and the plane corresponding to frame is between 60 degrees and 90 degrees, so that the intersection formed by the light emitted by the adjacent LEDs can be at least at the non-display area of the display panel. Therefore, there are no dark lines under the display panel.

In order to avoid vignetting, the arc shape of the light bar 120 can be further designed. In another embodiment, a radius of curvature of an arc point where the light emitting units 110 on the light bar 120 near two ends of the back plate 140 respectively are located is less than a preset maximum value. The preset maximum value is a maximum radius of curvature of the arc point. At the arc point with the maximum radius of curvature, the light with the largest offset angle relative to optical normal emitted by the light emitting units 110 near the two ends of the back plate 140 is projected to a vertex of a corner of the display panel.

The larger the radius of curvature, the smaller degree of bending of the light bar, and the light bar closer to the back plate, which may easily leads to the vignetting. In order to avoid vignetting, according to the display panel size, such as length, height, etc., the maximum radius of curvature of the light bar 120 should be calculated, while the degree of bending of the light bar is minimum and vignetting can be avoided. While design, the radius of curvature of the arched light bar should be smaller than the maximum radius of curvature.

It should be understood that the light bar can be a circular arc or a non-circular arc. The non-circular arc may result in different radius of curvature at different positions of the light emitting units LEDS. In this case, the preset maximum value is a maximum radius of curvature of the arc point where the light emitting units near the two ends of the back plate of the light bar are located.

In this embodiment, the light emitting units LEDs may be separately disposed on the arc-shaped light bar according to needs, including the position, inclination angle and the like of the light emitting units LEDs on the light bar, and the distance between the light emitting units LEDs.

When the light emitting unit emits light, a certain amount of heat is generated. If the heat is not dissipated in time, the lifetime of the display device may be affected, and even to cause a malfunction. For this reason, heat dissipation material can be filled between the light bar and the back plate. As such, when the light emitting unit emits light, the heat dissipation material can absorb the heat and dissipate the heat to the outside so as to enhance the display effect. Wherein, the heat dissipation material can be heat dissipation glue or the like.

In several embodiments provided in the present disclosure, it should be understood that the disclosed systems, apparatus, and methods may be implemented in other ways. For example, the device of the embodiment described above is merely illustrative, for example, the division of the units is only a logical function division, and there may be additional ways of actually implementing, for example, multiple units or components may be combined or can be integrated into another system, or some feature can be ignored, or not executed. Furthermore, the coupling, direct coupling or communication shown or discussed above can be achieved through some interfaces, indirectly connections of device or unit, or communications, which may be electrical, mechanical, or otherwise.

The units described as the separation means may or may not be physically separate, and the components shown as units may or may not be physical units, i.e., may be located in one place or may be distributed to multiple network elements. The part or all of the elements may be selected according to the actual needs to achieve the object of the present embodiment.

In addition, the functional units in the various embodiments of the present disclosure may be integrated in one processing unit, or each unit may be physically present, or two or more units may be integrated in one unit. The above-mentioned integrated unit can be implemented in the form of hardware, also be implemented in the form of hardware and software combined functions.

Finally, it should be noted that the above embodiments are merely illustrative of the technical solutions of the present disclosure and are not intended to be limiting thereof. For the person skilled in the art of the disclosure, without departing from the concept of the disclosure, simple deductions or substitutions can be made and should be included in the protection scope of the disclosure.

What is claimed is:

1. A display device, comprising:
a liquid crystal display panel;
a frame, comprising a back plate therein;
a backlight module, comprising a light source used for emitting light to the display panel;
wherein the light source comprises a light bar with a plurality of light emitting units, and each of the plurality of light emitting units has a light emitting surface facing directly towards an edge of the display panel;
and the light bar is fixed on the back plate, and the light bar is oppositely disposed on the back plate, so that portions of light emitted from the light emitting surfaces of the light emitting units near two ends of the back plate on the light bar are shifted to corners of the display panel correspondingly.

2. The display device according to claim 1, wherein the light bar being oppositely disposed on the back plate comprises the two ends of the light bar being inclined with respect to the back plate, so that the portions of light emitted by the light emitting units near two ends of the back plate on the light bar are shifted to corners.

3. The display device according to claim 1, wherein the light bar being oppositely disposed on the back plate comprises the light bar being arched relative to the back plate, so that the light emitting units of the light bar near two ends of the back plate are correspondingly in arc-shaped distribution, and the portions of light emitted by the light emitting units near two ends of the back plate are shifted to corners.

4. The display device according to claim 3, wherein the light emitting units of the light bar are correspondingly in the arc-shaped distribution, and there is a preset angle between an optical normal of the light emitting unit and a plane corresponding to the frame.

5. The display device according to claim 4, wherein the preset angle is in the range from 60 degrees to 90 degrees.

6. The display device according to claim 3, wherein a radius of curvature of an arc point where the light emitting units on the light bar near two ends of the back plate respectively are located is less than a preset maximum value; the preset maximum value is a maximum radius of curvature of the arc point, at the arc point with the maximum radius of curvature, the light with the largest offset angle relative to optical normal emitted by the light emitting units near the two ends of the back plate is projected to a vertex of a corner of the display panel.

7. The display device according to claim 1, wherein heat dissipation material is filled between the light bar and the back plate.

8. The display device according to claim 1, wherein the display panel comprises a display area and a non-display area connected to the display area, a part of intersections formed by the light emitted by two adjacent light emitting units on the light bar are located on a boundary between the display area and the non-display area or on the non-display area.

9. The display device according to claim 8, wherein the part of intersections being located on the boundary between the display area and the non-display area or on the non-display area comprises only one intersection point located on the boundary between the display area and the non-display area.

10. The display device according to claim 1, wherein an offset angle formed between the optical normal of the light emitting unit and the horizontal direction or vertical direction is in the range from 0 degrees to 30 degrees.

11. The display device according to claim 1, wherein an angle formed between the optical normal of the light emitting unit and a plane corresponding to the frame is in the range from 60 degrees to 90 degrees.

12. The display device according to claim 1, wherein the back plate is flat, and the light bar is in an arch shape relative to the back plate.

13. The display device according to claim 1, wherein the light bar is in an arch shape, and the arch shape is a circular arc or a non-circular arc.

14. The display device according to claim 1, wherein distance between the back plate and the light emitting unit on the light bar increases from both ends of the back plate toward a middle of the back plate.

15. A display device, comprising:
A liquid crystal display panel;
a frame, comprising a back plate therein;
a backlight module, comprising a light source used for emitting light to the display panel;
wherein, the light source comprises a light bar with a plurality of light emitting units, and each of the plurality of light emitting units has a light emitting surface facing directly towards an edge of the display panel;
wherein the light bar is arched relative to the back plate; and
wherein the light emitting units of the light bar near two ends of the back plate are correspondingly in arc-shaped distribution or the two ends of the light bar are inclined with respect to the back plate, so that the portions of light emitted from the light emitting surfaces of the light emitting units near two ends of the back plate are shifted to corners.

16. The display device according to claim 15, wherein the back plate is flat, heat dissipation material is filled between the light bar and the back plate.

17. The display device according to claim 15, wherein the display panel comprises a display area a non-display area connected to the display area, a part of intersections formed by light emitted by two adjacent light emitting units on the light bar are located on a boundary between the display area and the non-display area or on the non-display area.

18. The display device according to claim 17, wherein the part of intersections being located on a boundary between the display area and the non-display area or on the non-display area comprises only one intersection point located on the boundary between the display area and the non-display area.

19. The display device according to claim 15, wherein distance between the back plate and the light emitting unit on the light bar increases from both ends of the back plate toward a middle of the back plate.

20. A display device, comprising:
a liquid crystal display panel;
a frame, comprising a back plate therein;
a backlight module, comprising a light source used for emitting light to the display panel;
wherein the light source comprises a light bar with a plurality of light emitting units, and each of the plurality of light emitting units has a light emitting surface facing directly towards an edge of the display panel;
wherein the light bar is fixed on the back plate, and the light bar is oppositely disposed on the back plate, so that portions of light emitted by the light emitting units near two ends of the back plate on the light bar are shifted to corners of the display panel correspondingly;
wherein the light emitting units of the light bar are correspondingly in the arc-shaped distribution, and there is a preset angle between an optical normal of the light emitting unit and a plane corresponding to the frame; the preset angle is in the range from 60 degrees to 90 degrees;
wherein a radius of curvature of an arc point where the light emitting units on the light bar near two ends of the back plate respectively are located is less than a preset maximum value;
wherein the preset maximum value is a maximum radius of curvature of the arc point, at the arc point with the maximum radius of curvature, the light with the largest offset angle relative to optical normal emitted by the light emitting units near the two ends of the back plate is projected to a vertex of a corner of the display panel; heat dissipation material is filled between the light bar and the back plate;
wherein the display panel comprises a display area and a non-display area connected to the display area, only one intersection formed by the light emitted by two adjacent light emitting units on the light bar are located on a boundary between the display area and the non-display area; and
wherein a filler material is added between the back plate and the frame to fix the back plate and the light bar, the light bar and the back plate have the same shape, the light bar and the back plate are bent from both ends to a middle of the frame to form the same arc shape.

* * * * *